Sept. 24, 1968 G. J. OLNEY 3,402,748
VEGETABLE TRIMMER AND SLICER
Filed April 15, 1965 3 Sheets-Sheet 1

INVENTOR.
GEORGE J. OLNEY
BY John P. Murphy
ATTORNEY

Sept. 24, 1968  G. J. OLNEY  3,402,748
VEGETABLE TRIMMER AND SLICER
Filed April 15, 1965  3 Sheets-Sheet 2
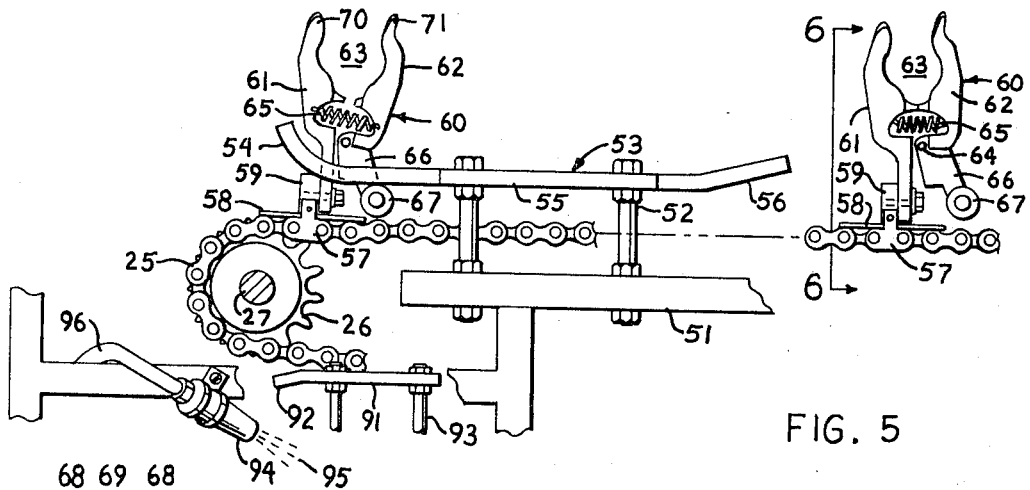
FIG. 5
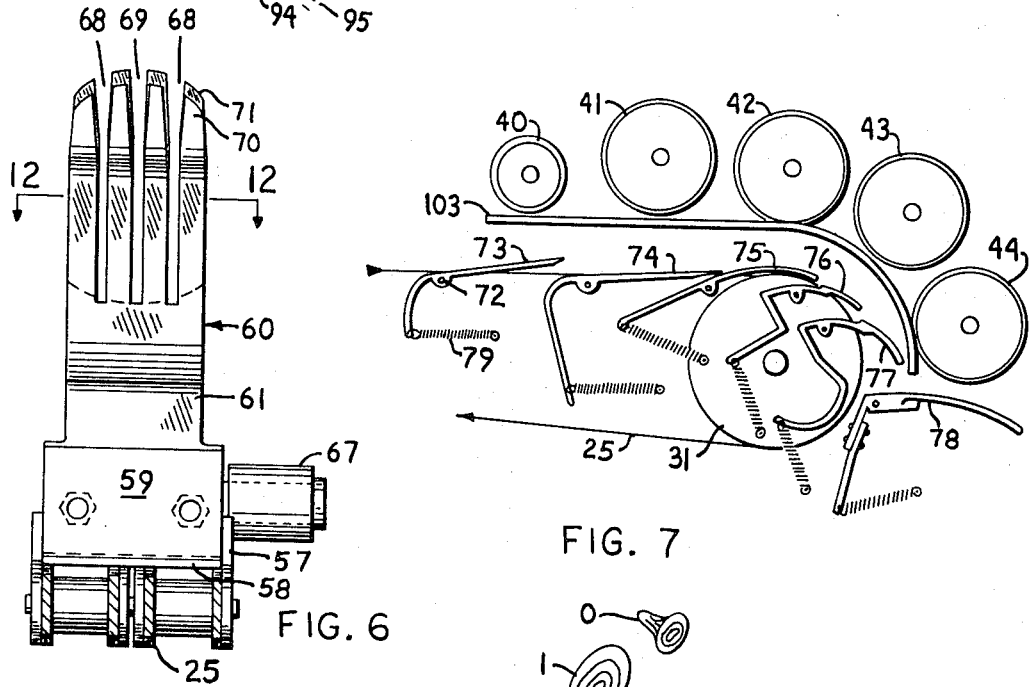
FIG. 6
FIG. 7
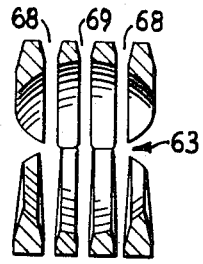
FIG. 12
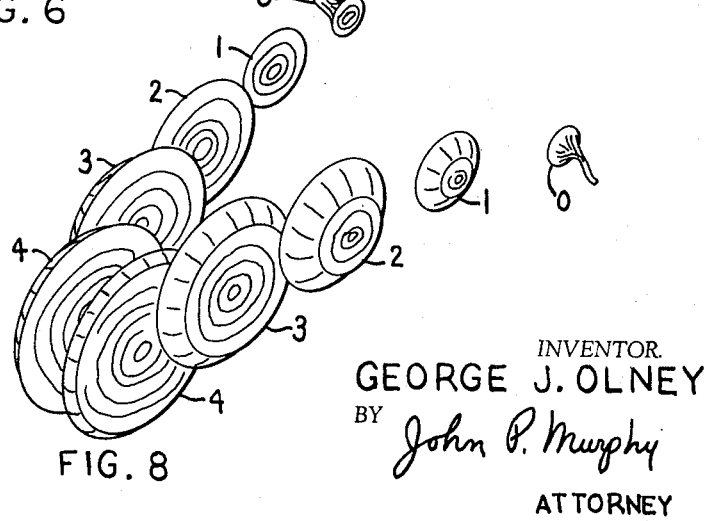
FIG. 8
INVENTOR.
GEORGE J. OLNEY
BY John P. Murphy
ATTORNEY

United States Patent Office 3,402,748
Patented Sept. 24, 1968

3,402,748
VEGETABLE TRIMMER AND SLICER
George J. Olney, Westernville, N.Y., assignor to Geo. J. Olney, Inc., Westernville, N.Y., a corporation of New York
Filed Apr. 15, 1965, Ser. No. 448,374
6 Claims. (Cl. 146—78)

ABSTRACT OF THE DISCLOSURE

A vegetable trimming machine, for trimming the roots and stems from bulbous vegetables, and slicing same.

---

This machine relates to vegetable trimming machines, and more specifically to a device for trimming the roots and stems from a bulbous vegetable and then slicing same.

Two major considerations are apparent in preparing a bulbous vegetable for further processing, where the preparation comprises a trimming operation and a slicing operation. First, the size of the vegetable must be determined and only the unwanted stem and root ends trimmed, without trimming and thus losing desirable portions. Secondly, if the vegetable is to be sliced, such slices must be regular and uniform. As an example, in the preparation of fried onion rings, the onions must be sliced into uniformly thick slices across the root axis so that each slice may be separated into rings. The controlled thickness will result later in correctly cooked products, due to the predictable cooking time based on thickness of the vegetable portion.

Accordingly, it is a primary object of this invention to provide improvements in the automatic processing of vegetables incident to forming regular slices of the vegetables. A further object is to combine the trimming and slicing operations into a single mechanical operation. Another object is to achieve a straight-line operation based on a minimum amount of apparatus offering a maximum amount of control, and which will also provide a self-cleaning function to the device. Another object is to provide apparatus wherein the control is inherent in the device; such that operator attendance may be reduced to supplying material to be processed.

These and other objects will become apparent from a reading of the following detailed specification with reference to the accompanying drawings.

In carrying out the objects of the invention, there is provided a machine for trimming and slicing bulbous vegetables comprising a continuous carrier means movable along an axis of a frame. Clamp means carried by said carrier is adapted to retain in onion placed therein with the root axis disposed transversely of the movement of the carrier. Means is provided for making spaced vertical parallel cuts through a vegetable held in said claim means. First and second discharge means provides for discharging the root and stem portions and the sliced portions respectively, following actuation of release cut portions of the vegetable.

In the drawings:

FIG. 5 is an enlarged fragmentary elevation of a portion of the embodiment of FIG. 1, showing the idler and cam mechanisms.

FIG. 6 is an enlarged sectional view of a clamp along the line 6—6 of FIG. 5.

FIG. 7 is a schematic view of the trimming and slicing stations and associated clamping cams.

FIG. 8 is a perspective view of an onion sliced in stages according to this invention.

FIG. 12 is a sectional view taken along the line 12—12 of FIG. 6.

Figure 1:
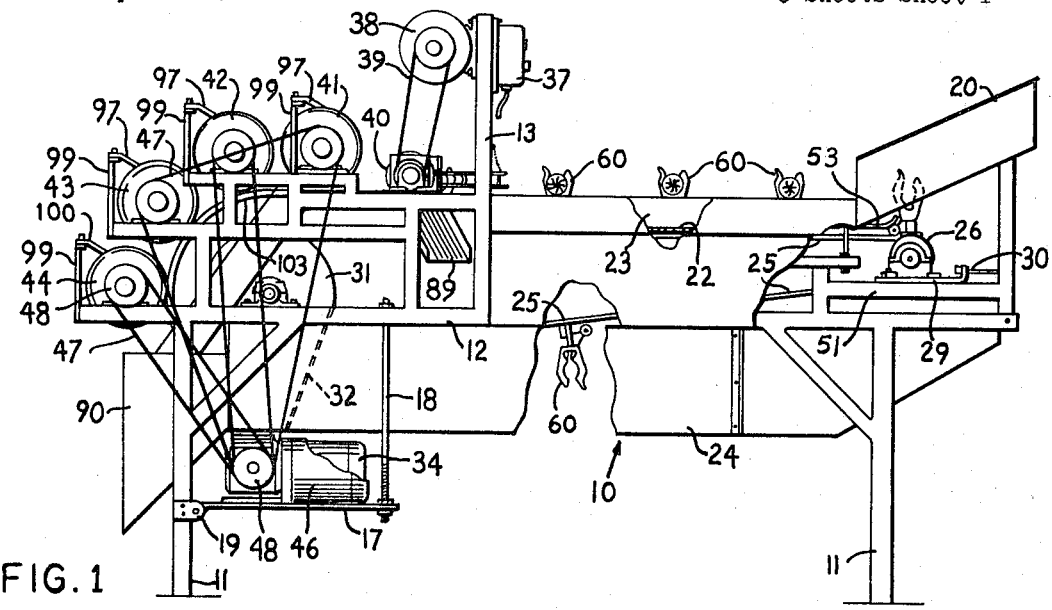
FIG. 1 is a longitudinal side elevation, with parts cut away, of an embodiment of an onion trimmer and slicer according to this invention.
Figure 2:
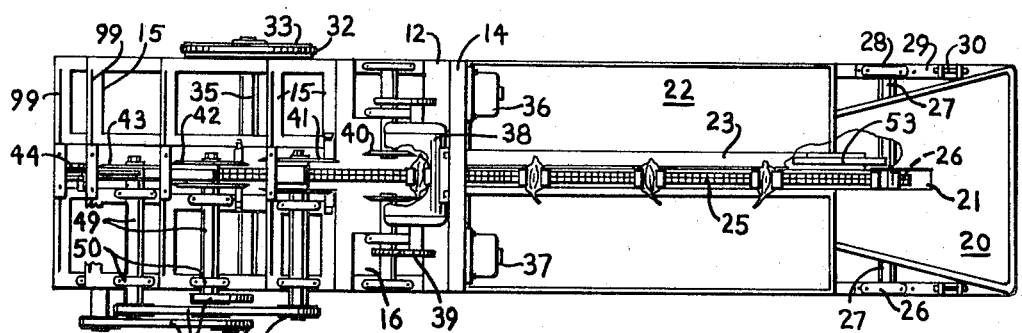
FIG. 2 is a plan view of the apparatus of FIG. 1.

Referring to FIGS. 1 and 2, a preferred embodiment of a machine for processing onions is generally indicated at 10, comprising a frame having legs 11 and longitudinal rails 12. Transverse frame members 15 are disposed where required, as will appear. A partition frame 13 is erected above the rails 12 intermediate the ends of the machine, and has a cross member 14. Between the frame 13 and one end of the machine lies a table 22 of sheet metal or the like in the form of a shallow pan for the use of the operator in handling vegetables. A feed hopper 20 may be disposed above one end of the table 22, and may be formed with converging sides and a substantially central opening 21 to facilitate the supplying of onions to the mechanism, as will appear.

A continuous conveyor or carrier means in the form of an endless roller chain 25 is disposed in the frame movable along a substantially central horizontal axis of the frame of machine 10. The roller chain 25 is best seen in FIGS. 5 and 6 as a conventional double roller chain adapted to operate on suitable sprockets.

Clamp means 60 for the onions are fastened to the chain 25 for movement therewith. Each clamp 60 is adapted to retain an onion placed therein with the root and stem disposed transversely to the direction of movement fo the chain 25. One end of the machine is provided with an idler sprocket 26 on shaft 27 which is disposed in conventional pillow bearings 28. A drive sprocket 31 is mounted on shaft 35 in pillow bearings at the other end of the machine 10 to complete the means for carrying the chain 25. Pillow bearings 28 may be mounted on adjustable plates 29 with drawbolts 30 for adjusting the tension of chain 25 as required. The shaft 35 may have a pulley 33 mounted on one end which is connected to a source of power such as an electric motor 34 by means of a drive belt 32 for moving the chain 25 and clamps 60 along the machine.

Any shroud 24 may be provided to enclose the chain and clamps against possible damage below the rails 12. A similar enclosure 23 may be formed above the bed of the table to prevent onions fram becoming entangled with the chain 25.

It should be clear that the chain 25 and clamps 60 move from right to left above the rails 12 in FIGS. 1 and 2, returning from left to right below the rails 12. Any switch box 36 may be mounted conveniently on the partition frame 13 for permitting the operator to turn motor 34 on or off.

The end of the machine opposite the table end contains means for making spaced vertical parallel cuts through an onion held in the clamp means 60. A plurality of blades 40, 41, 42, 43, and 44 is arranged in sets for performing trimming and slicing operations at several stations as will appear.

Discharge means for the trimmed-off root and stem ends is provided in the form of a suitable chute 89 adapted to carry the ends away to a waste receptacle, not shown. Another chute 90 receives sliced portions of the onions and is adapted to deliver same to a conveyor (not shown) for further processing.

FIGS. 5, 6, and 12 illustrate details of the onion clamps 60. Each clamp 60 comprises a fixed upstanding member 61 and a moveable member 62 pivotally carried on a pivot pin 64. The opposing faces of each member are concave, defining a space 63 in which an onion may be carried. A tension spring 65 connected between members 61 and 62 urges said members toward the space 63 in clamping relationship with any onion disposed therein. The upper portions of members 61 and 62 are each formed into fingers 70 and 71 respectively by a central slot 69 and a pair of flanking slots 68 through which the slicing blades will pass, as will appear. Although the clamps 60 are adapted to be opened and closed automatically, by apparatus to be described, the fingers 71 of the movable member 62 are formed longer than the fingers 70 of the fixed member 61. Thus, an operator may also open a clamp manually by pushing an onion against the movable member 62, moving same away from the fixed member 61 using the upper ends of fingers 71 as a lever. It should be noted that the slots 68 and 69 are formed in a slight V-shape along the leading edges of members 61 and 62 and face the slicing blades, some of which will pass through slots 68 and 69. Therefore, the slots are V-shaped to prevent any accidental direct engagement of the blades with members 61 and 62.

In discussing the mounting of the clamps on the chain 25, it is pointed out that certain operations may be carried out on the onion when the clamp is on an unsupported portion of the chain. That is to say, when the chain is not actually traveling over a sprocket. Deformation of the chain and the resultant tilting of the respective clamp 60 is avoided by a platform mounting arrangement for each clamp. An inverted T-shaped mounting is formed of a platform 58 and a block 59 which may be welded together and then disposed over several links of the chain 25. The end plates 57 of one of the links are replaced by special ones, having a vertical member which may be welded to the block 59; said block is, in turn, drilled for mounting bolts. The fixed member 61 of the clamp is thus bolted to the block 59 of the platform mounting structure. It will be apparent that, as the chain 25 travels around the sprockets, the mounting does not deform the chain to prevent proper engagement of the rollers with the sprocket teeth. However, when an onion held in a clamp later meets with the cutting blades, the resistance of the onion to the slicing does not have any effect since the platform 58 does prevent deformation of the chain under this resistive pressure.

FIGS. 1, 2 and 5 illustrate automatic apparatus for opening and closing the clamps 60 to receive and clamp onions for slicing. Additional frame members 51, as required, are placed beneath the feed hopper 20 for supporting the sprocket shaft 27 and clamp-actuating cam 53. Cam 53 comprises an elongated plate mounted on suitable posts 52, and formed with bent ends. Posts 52 can be threaded studs disposed through frame members 51 and cam 53, with suitable lock nuts to facilitate adjustment of the height of cam 53 relative to the clamps 60. The end adjacent the sprocket 26 is curved to form a cam engaging ramp 54, while the other end forms a release ramp 56. The straight intermediate surface 55 is a holding surface for retaining the clamp 60 in open position. The lower end of the movable member 62 of the clamp is formed with an extension 66 on which is carried a roller 67 which acts as a cam follower. It will be seen that, as a clamp 60 is carried around the sprocket 26, the roller 67 engages ramp 54 and is depressed thereby to move member 62 pivotally on pin 64 and away from member 61. This action enlarges space 63 such that an onion may be placed therein. Sufficient time is allowed to place an onion in the clamp while same moves along the holding surface 55, after which the roller 67 moves upwardly along release ramp 56, causing the clamp members to engage the onion (not shown) gently in clamping action.

In order to slice the onion to uniformly size slices, it is necessary that the slicing knives operate without squeezing the onion. It will be apparent that any squeezing caused by the thickness of a slicing blade or the like would deform the onion temporarily and cause irregular slices to be made in subsequent cuts. One of the novel features of this invention therefore lies in the selection and disposition of the blades used for trimming and slicing. Simultaneous slicing would cause compression of onion slices between blades with a resultant jam of slices in the blades. To correct this, the slices are made in separate stations following the trimming operation.

Figures 3, 4, 11:
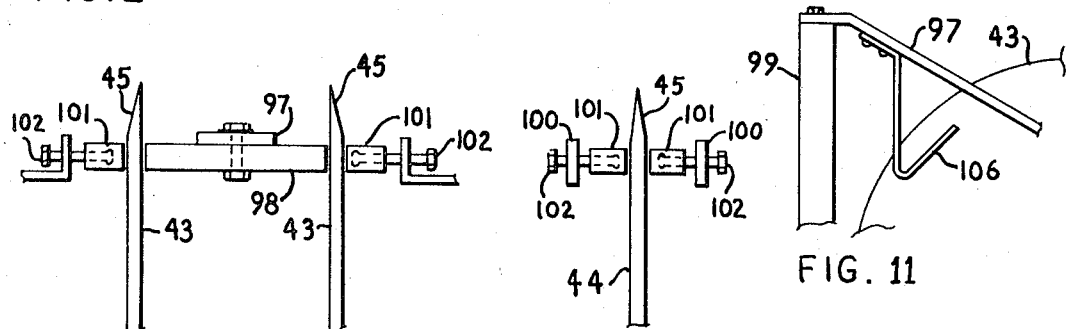
FIGS. 3 and 4 are enlarged fragmentary sectional views of slicing blades and associated structure used in this embodiment.
FIG. 11 is an enlarged fragmentary view of structure associated with the slicing blades.

In FIGS. 1, 2 and 7, a first pair of blades 40 is adjustably disposed for trimming the root and stem ends of the onion; 41 indicates a first pair of outside slicing blades; 42, a second pair of outside slicing blades spaced inwardly of blades 41 along the root axis; 43 along the root axis; 43, a pair of inside slicing blades spaced inwardly of blades 44 along the root axis; and, 44, a single center slicing blade at the center of the root axis. It will be seen that slices are made from the outside of the onion, and progressively toward the center. To prevent the above-described jamming, blades 40, 41, 42, and 43 are formed as shown in FIG. 3 with the inside surfaces perfectly flat and with the bevel 45 formed only on the outside surface. Hence, slices are formed and directed away from the uncut portion of the onion. The center cut blade 44 is beveled on both sides at 45 to separate the final two slices as they are formed and thus prevent jamming.

This slicing pattern is best shown on FIG. 8. Cut portions 0 are the root and the stem ends of the onion. Slices 1 are the first outside slices in relative position to the size and position of the onion at the time they were cut by blades 41. Slices 2 are the second outside slices formed by blades 42, and so-called since blades 41 and 42 cut off those portions of the onion which extend outwardly of the sides of clamp fingers 70 and 71. Slices 3 are the inside slices formed by blades 43 which operate through the slots 68 through the members 61 and 62 of the clamps. Finally, slices 4 are the center cuts formed by blade 44 at the last cutting station in the machine. It will be apparent that the beveled surfaces 45 of the various blades direct each successive pair of slices outwardly away from the uncut portion of the onion, while the flat inner surfaces of the blades ride freely on the said uncut portion.

Each pair of blades 41, 42, 43, and 44 is carried rotatably on a suitable shaft 49 journaled in pillow bearings 50 which are fastened to the various frame members 15. Each shaft 49 has fixed to one end a pulley 48. A system of drive belts 47 connects the shafts and hence also the slicing blades. It will be seen in FIG. 1 that each motor 34 and 46 may be mounted on a separate platform 17. A switch box 37 may be provided to furnish electrical power to motor 46 when actuated by the operator of the machine. To facilitate adjustment of the drive belts 47 and 32, each platform 17 is pivotally attached as at 19 to a leg 11 of the machine and supported by an adjustable bolt 18. Adjusting the length of either bolt 18 raises or lowers the corresponding platform 17, thus effecting proper adjustment of drive belt 47 or 32.

The speed of the cutting blades is closely matched to the speed of the advancing clamp, being likened to the mating of toothed gears. This minimizes any friction between the blades and the onion, thus minimizing any forces which would tend to cause irregular slices to be formed. This is a very important feature of this invention.

FIG. 7 is a schematic view of the trimming and slicing stations and associated clamping cams. In order to assure positive clamping of an onion and prevent any turning thereof in a clamp as it passes the cutting stations, auxiliary clamping cams are provided to operate against the cam roller 67, urging same upwardly and thus augmenting the clamping pressure exerted by the spring 65 in a clamp 60. Reference numerals 73, 74, 75 and 76 and 77 indicate a series of cams, each of which is pivotally mounted as by suitable pivot pin 72 to the frame of the machine. Tension springs 79, committed to the frame urge the cams outwardly in a direction to engage the cam roller 67 of each clamp. Another cam 78 is disposed to engage the roller 67 in the same manner as cam 53 to open the clamp 60, forming release means for the center slices of an onion.

In conjunction with the V-shaped slots 68 and 69 described before, means associated with the slicing blades is provided to prevent any momentary deflection of said blades out of their normal position. Each pair of blades, as exemplified by blades 45 in FIG. 3 is provided with a center guide spacer 98 of suitable size to extend between the blades when mounted on a support 97. The support 97 is mounted on upstanding portion 99 of the transverse frame members 15. See also FIGS. 1 and 2. Spacer 98 is, in each case, just long enough to just miss the inner flat surfaces of the blades; and may be formed of, for instance, bronze or other suitable material that will withstand an occasional "brush" against the rotating blades. An adjustable guide shoe 101 of the same material is also disposed at each blade on an adjustable support 100. Any screw 102 or the like may be employed for effecting a positional adjustment of shoe 101. Blade 44 is provided with the guide shoes 101 and associated means 100 or 102 as shown in FIG. 4.

There is some tendency for an onion to be raised upwardly from a clamp 60 near the completion of a cut, due in part to the unavoidable minimal compression between a pair of blades. Hence a retainer plate 106, see FIG. 11, is disposed to depend from each support 97 associated with blades 41, 42 and 43, such that said plate is adapted to engage the top of an onion in a clamp as it leaves a slicing station.

Additionally, onions may generally be larger on one end than on the other, so that cutting effort will be greater on the larger end. This situation tends to pull the clamp 60 and chain 25 sidewardly as it passes a cutting station. To avoid this, indexing rails 103 are disposed adjustably along the cutting stations, see FIGS. 1, 7 and 9. The rails are carried at several points as by adjustable mounting plates 104 adapted for positional adjustment by any suitable screws 105. Each clamp 60 enters the cutting stations with the rails 104 bearing against the sides of the upper portions of said clamps, thus positively indexing the slots 68 and 69 relative to the blades.

During the cutting operation, some skins may become stuck to the clamps, which could cause jamming of the blades in a successive operation. Removal of any skins is most advantageous while the clamps 60 are hanging down from the chain 25 during the return travel to sprocket 26. At this position, there is some small amount of slack in the chain. Therefore, another cam plate 91 is mounted on bolts 93 in the same fashion as cam 53, see FIG. 5. A snap cam 92 is formed on plate 91 near the sprocket 26. As the clamp 60 (not shown) approaches the sprocket, roller 67 engages snap cam 92 and "snaps" the clamp members to dislodge any onion skins which may be stuck thereto. Further, a nozzle 94 terminates any suitable supply pipe 96 to direct a spray 95 of water or other fluid against the clamp for flushing same clean of skins and onion juice.

FIGS. 1, 2, 9 and 10 illustrate details of the adjustable trimming blades and their associated structure. A drive motor 38, also receiving power through switch box 37, is mounted on the partition frame 13 and cross member 14 and is provided with pulleys at each end over which are disposed belts 39. Each blade 40 of the trimming blade pair is mounted on the inner end of a stub shaft 80, with no mechanical connection between the two blades. Mounting plates 16 are fastened to the frame rails 12 such that each plate 16 has mounted thereon a pair of bearings 81 through which the two stub shafts 80 are disposed rotatably and slidably. A pulley and collar 82 is fixedly keyed to each shaft 80 adjacent the inner bearing 81 of each pair. An expansion spring 83 is coaxially disposed around each stub shaft 80 between the pulley and collar 82 and the outer bearing 81, thus always urging the pulley and collar 82 and shaft 80 towards the inner bearing. This urging by springs 83 assures that the position of blades 40 will normally be at the innermost limit as defined by the position of the pulley and collar 82 on each shaft 80. Because each onion varies in size, means is provided to adjust the distance between the blades 40 so that only the actual root and stem ends of the onion may be trimmed without wasting any of the useful portions of the onion. Each stub shaft is journaled as at 85 to an extension plate 84 of an otherwise freely suspended guide shoe. Each guide shoe may be formed by a pair of spaced rods 87 suspended from the cross member 14 by a suitable flexible member 88, such as a chain, and attached at one end to a laterally movable plate 86. Each extension plate 84 is adjustably fastened to the plate 86 as by bolts through slots which permit adjustment of the position of plate 84 relative to plate 86. The chains 88 support the weight of the guide shoes, relieving some forces on the bearings 81.

In operation, the operator supplies electrical power to the motors 34 and 38, 46 respectively by turning on switches 36 and 37. This causes the chain 25 to move along an axis of the machine and carry the spaced clamps 60 through the cam stations and past the trimming and slicing stations; and causes the trimming and slicing blades to rotate for slicing the onions.

Figure 9:
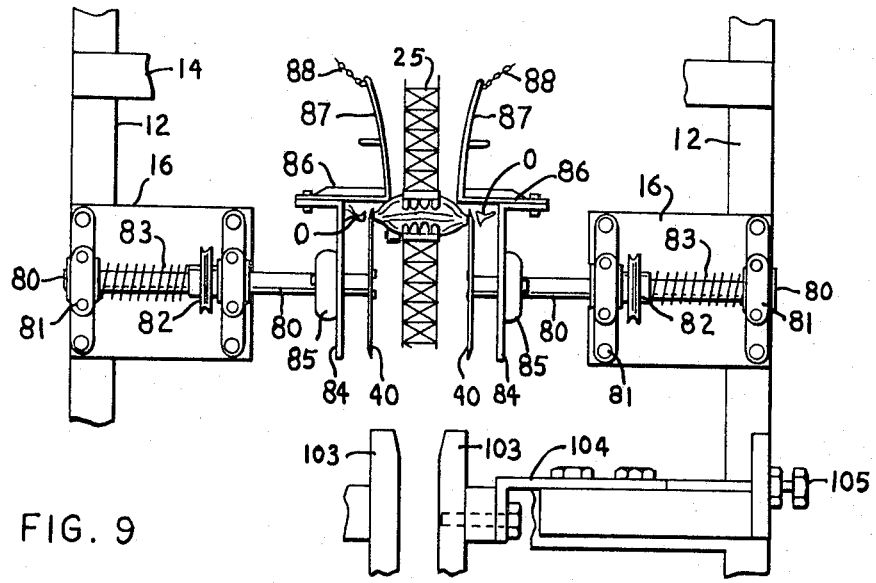
FIG. 9 is an enlarged framgentary plan view of the trim gaging and clamp guide mechahisms.
Figure 10:
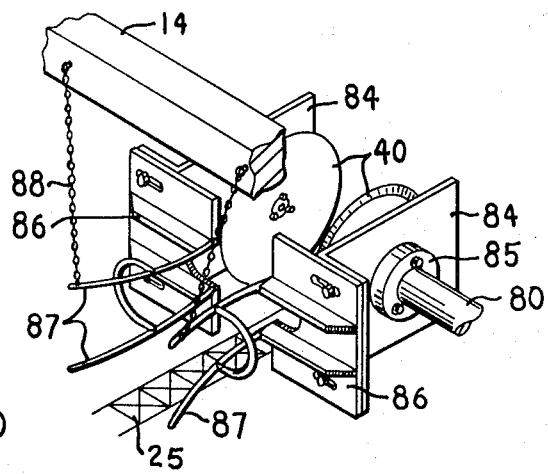
FIG. 10 is an enlarged fragmentary perspective view of the trim gaging mechanism.

As each clamp 60 is opened on approaching the cam plate 53, the operator places an onion from feed hopper 20 in the space 63 between members 61 and 62 such that the root axis of the onion lies transversely to the direction of motion of the chain and clamp. The onions are carried along as in FIGS. 1 and 2 and approach the guide shoes. Referring to FIGS. 9 and 10, as the onion approaches the trimming blades 40, it engages the pairs of guide shoe rods 87, moving them away from each other, thus also moving the blades 40 laterally into proper spaced relationship for trimming off only the unwanted root and stem ends 0. The trimmings then fall into a chute 89 for discharge into any receptacle, not shown.

As the clamp carries the onion past blades 40, it is pointed out that the cam roller 67 rides on cam 73 which urges the members 61 and 62 into increased clamping relationship, thus preventing any displacement of the onion in the clamp during the cutting. The clamp and onion thus trimmed are then carried by chain 25 into engagement with the indexing guide rails 103 and the first outside slicing blades 41 while cam 74 maintains proper clamping pressure; and slices 1 are made. These fall into chute 90 for collection and discharge to further processing. All other slices are formed progressively until blade 44 has formed the final center cut. The cam roller 67 then engages cam 78 which releases the clamp similarly to the action of cam 53 and permits the final slices 4 to be discharged. The clamp 60 is returned for another onion through the shroud 24 as shown in FIG. 1, following the cleaning operation by snap cam 92 and the water spray 95.

The objects of the invention having been accomplished, the embodiment disclosed herein is described for purposes of illustration and the examples made thereby are not intended to be exhaustive or to be limiting of the invention. It is to be understood that the invention is to be construed within the true spirit and scope of the appended claims.

I claim:

1. A vegetable processing machine adapted to trim undesired portions and slice useful portions of a vegetable comprising the combination of an elongated frame, an elongated continuous conveyor means mounted movably along the axis of said frame, releasable vegetable engaging clamp means carried by said conveyor, said clamp being adapted to retain a vegetable with the root axis transverse to the direction of movement, means for making spaced regular cuts progressively through a vegetable as it is carried along said frame; said last means comprising pairs of slicing blades spaced progressively inwardly of each other along the root axis and a center blade at the center of the axis, said blades being disposed progressively along the said frame, said blades being rotatable at a speed matching the speed of said conveyor means the first pair of blades being adapted for trimming off the root and stem ends of a vegetable and the remaining blades being adapted to slice the useful portion of the vegetable into uniform slices; cam means for releasing sliced portions from said clamp means, first discharge means for discharging trimmed off portions and second discharge means for discharging sliced portions of a vegetable.

2. A vegetable processing machine adapted to trim undesirable portions and slice useful portions of a vegetable comprising the combination of an elongated frame, a continuous conveyor means mounted movably along an axis of said frame, vegetable engaging clamp means carried by said conveyor, said clamp means adapted to retain a vegetable with the root axis transverse to the direction of movement, means for making spaced regular cuts through a vegetable in said clamp means, means for releasing cut portions of a vegetable from said clamp, first discharge means for trimmed-off portions of a vegetable, and second discharge means for sliced portions of a vegetable, said clamp means comprising a fixed member and a movable member pivotally carried by said fixed member, said movable member being normally urged toward said fixed member defining a vegetable-receiving space therebetween, and a cam follower on said movable member, cam means on said frame engageable with said cam follower for opening and closing said movable member, and said release means comprising a second cam member for opening and closing said movable member.

3. The combination according to claim 1; said clamp means comprising a fixed member and a movable member pivotally carried by said fixed member, said movable member being normally urged toward said fixed member defining a vegetable-receiving space therebetween, and a cam follower on said movable member, cam means on said frame engageable with said cam follower for opening and closing said movable member, and said release means comprising a second cam member for opening and closing said movable member.

4. The combination according to claim 1 further characterized by said trimming blades being loosely journaled for lateral movement relative to said conveyor member, means for actuating said trimming blades laterally comprising a pair of guide shoes operatively connected adjacent said blades for movement therewith, said guide shoes being suspended on flexible members attached to said frame, said guide shoes being further movable by engagement with a vegetable passing therebetween to adjust the position of said trimming blades.

5. A vegetable trimming machine of the type adapted to remove undesired stem and root ends of bulbous root-type vegetables comprising in combination a main frame member; an elongated conveyor member mounted in a generally horizontal position on said frame; a plurality of pairs of vegetable engaging fingers mounted at spaced intervals along said conveyor member; a pair of vegetable trimming blades mounted on said frame adjacent one end of said conveyor member, said trimming blades being loosely journaled for lateral movement relative to said conveyor member, means for actuating said trimming blades mounted on said frame above said blades, means operatively connecting said blades to said actuating means; a pair of guide assemblies adjustably mounted adjacent said trimming blades for lateral movement therewith; a pair of flexible supporting members connected to the upper ends of said guide assemblies and extending upwardly to a portion of said main frame thereabove; said actuating means and said flexible supporting members acting to carry substantially all the weight of said trimming blades and guide assemblies and to oppose the normal drag imposed on said blades and guide assembly by the vegetable in the trimming operation whereby all possible frictional forces are removed from said trimming members so that they may readily move laterally relative to the vegetable to be trimmed as it is passed therebetween.

6. A device as described in claim 5 further characterized by a cam follower member mounted on said pairs of vegetable engaging fingers; a pair of cam members pivotally mounted on said frame member adjacent said trimming blades and positioned to engage said cam follower members, one of said cam members being positioned to close said fingers on contact with said cam followers and the other cam member being positioned to open said fingers on contact with said followers after the trimming operation; said cams being spring-urged about the pivot points to the actuating position; whereby said fingers are positively yet adjustably urged to the proper operating condition.

References Cited
UNITED STATES PATENTS

| | | | |
|---|---|---|---|
| 1,397,198 | 11/1921 | Alchin. | |
| 2,102,475 | 12/1937 | McNitt | 146—163 |
| 2,158,977 | 5/1939 | Douthitt | 146—84 |
| 2,487,719 | 11/1949 | Meyer | 146—78 |
| 2,974,699 | 3/1961 | Boles et al. | 146—83 |
| 3,013,596 | 12/1961 | Ashlock | 146—98 |
| 3,122,189 | 2/1964 | Edde | 146—83 |

FOREIGN PATENTS 650,653    2/1951    Great Britain.

W. GRAYDON ABERCROMBIE, *Primary Examiner.*